US008392713B2

(12) United States Patent
Hughes et al.

(10) Patent No.: US 8,392,713 B2
(45) Date of Patent: Mar. 5, 2013

(54) SECURE OFFLINE ACTIVATION PROCESS FOR LICENSED SOFTWARE APPLICATION PROGRAMS

(75) Inventors: Aidan Hughes, Bellevue, WA (US); Douglas R. de la Torre, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 1160 days.

(21) Appl. No.: 11/756,721

(22) Filed: Jun. 1, 2007

(65) Prior Publication Data

US 2008/0301447 A1 Dec. 4, 2008

(51) Int. Cl.
*H04L 9/00* (2006.01)
(52) U.S. Cl. ........ 713/176; 713/155; 713/171; 713/177; 726/26; 726/27; 726/28; 726/31; 726/33
(58) Field of Classification Search .................. 713/155, 713/171, 176–177
See application file for complete search history.

(56) References Cited

U.S. PATENT DOCUMENTS

| | | | | |
|---|---|---|---|---|
| 5,553,143 | A | 9/1996 | Ross et al. | 380/25 |
| 5,864,620 | A | 1/1999 | Pettitt | 380/4 |
| 6,169,976 | B1* | 1/2001 | Colosso | 705/59 |
| 6,260,141 | B1 | 7/2001 | Park | 713/155 |
| 6,557,105 | B1 | 4/2003 | Tardo et al. | 713/193 |
| 6,978,022 | B2 | 12/2005 | Okimoto et al. | 380/211 |
| 6,993,664 | B2 | 1/2006 | Padole et al. | 713/200 |
| 7,171,662 | B1 | 1/2007 | Misra et al. | 717/177 |
| 7,779,482 | B1* | 8/2010 | Yen et al. | 726/30 |
| 2002/0120726 | A1* | 8/2002 | Padole et al. | 709/222 |
| 2002/0126850 | A1* | 9/2002 | Allen et al. | 380/277 |
| 2003/0156719 | A1 | 8/2003 | Cronce | 380/256 |
| 2003/0177401 | A1* | 9/2003 | Arnold et al. | 713/202 |
| 2004/0039916 | A1* | 2/2004 | Aldis et al. | 713/177 |
| 2004/0059938 | A1* | 3/2004 | Hughes et al. | 713/200 |
| 2004/0143746 | A1 | 7/2004 | Ligeti et al. | 713/185 |
| 2005/0076334 | A1 | 4/2005 | Demeyer | 717/177 |
| 2005/0080898 | A1* | 4/2005 | Block | 709/225 |
| 2007/0276836 | A1* | 11/2007 | Chatterjee et al. | 707/10 |

OTHER PUBLICATIONS

Aura, T. et al., "Software License Management with Smart Cards", *Proceedings of USENIX Workshop on Smartcard Technology*, May 10-11, 1999, http://www.tcs.hut.fi, 12 pages.
Seleborg, S., "Axantum Strong Software Licensing", http://www.axantum.com, 2004, Version 0.3, 6 pages.
"Revolutionizing the Distribution, Licensing and Protection of Software", http://www.keytechnology.com, 8 pages, Nov. 2004.

* cited by examiner

*Primary Examiner* — Andrew Nalven
*Assistant Examiner* — Amir Mehrmanesh
(74) *Attorney, Agent, or Firm* — Woodcock Washburn LLP (57) ABSTRACT

A computer readable medium for activating a software application for execution on a designated computer, where the computer readable medium has stored thereon computer executable instructions for performing the following steps: computing an installation identifier reflective of the software application and the designated computer; receiving an activation code generated in accordance with the installation identifier and a blinding factor value; computing a first verification code as a function of the installation identifier; computing a trial blinding factor value; computing a decryption key as a function of the trial blinding factor value and the activation code; using the decryption key to decrypt a second verification code; verifying that the first verification code matches the second verification code; and, activating the software application for execution on the designated computer.

14 Claims, 5 Drawing Sheets

SECURE OFFLINE ACTIVATION PROCESS FOR LICENSED SOFTWARE APPLICATION PROGRAMS

BACKGROUND

Conventional commercial software applications are typically delivered as physical media or as a software download (containing the software code) and an alpha/numeric product key. It is typical for an independent software vendors (ISV's) to require their products to complete an "activation" process before the full rights associated with the software are enabled for a specific user and/or computer. The activation process typically involves the transmission of the product key, along with some information identifying the user and/or computer to an activation clearinghouse. The clearinghouse is typically operated by the ISV, but the clearinghouse may also be operated by a third party. The clearinghouse responds with an authorization code enabling access to the rights associated with the software, thereby licensing the software.

Typically, the activation process is performed "online" over a computer network with bandwidth sufficient to transmit digital signatures, which cryptographically prove the validity of the authorization code. For users who cannot or choose not to activate via a computer network, a solution must be provided which supports "offline" media which has dramatically lower bandwidth. The most common example of such media is the telephone.

The cryptographic proof of validity is related to the difficulty of fabricating a counterfeit proof. The proof is typically based on the user's product key and identifying information, coupled with a private key which is known only to the authorization authority. As long as the private key is physically secured, the feasible means to generate a counterfeit proof are to semi/randomly create candidate proofs and check each for authenticity on the client or attempt to determine the private key value by analysis/brute force. Either attack will ultimately be successful, given sufficient time and processing power. The level of cryptographic security is determined by the time required to complete a successful attack. For digital signatures, this time is far beyond a normal human lifetime, given current processor power and mathematical techniques.

When a user activates over the telephone, however, the amount of data which can be related is extremely limited. This is due to the slow and error-prone nature of reading and transcribing data (typically numeric and/or alpha characters) over the phone. Specifically, the cryptographic signatures used to create authorization codes for online activation could potentially require hundreds of such characters, providing a customer experience which would be unacceptable to all but the most tolerant. Thus, there is a need for a short authorization code which provides protection from attack for a reasonable time but which is less cumbersome than the digital signatures employed during online software activation.

SUMMARY

Techniques for securely activating a licensed software application via an offline medium are disclosed herein. The techniques may enable full rights associated with the software application to be enabled for a specified computer. In particular, a package description file containing information required for licensing and activation, and an offline verification file containing a digital signature may be provided with the software application. The information in the package description file may include an effective hash length and a hash iteration count. The information in the package description file and the offline verification file for the specific software application may be stored at a remote server or clearinghouse.

Initially, an installation identifier representative of information about the software application and the computer it is loaded on is provided to the remote server and utilized to produce an activation code. The activation code includes a blinding factor associated therewith which takes into account the effective hash length and the hash iteration count to compute a decryption key. The decryption key is then utilized to access the package description file and obtain an encrypted hash value representative of the installation identifier.

The techniques also include obtaining a reference hash value of the installation identifier. Provided the encrypted hash value and the reference hash value match, the software application is activated. Otherwise, a new blinding factor is utilized with the activation code provided by the remote server and a new decryption key is computed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which.

DETAILED DESCRIPTION

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies.

Figure 1:
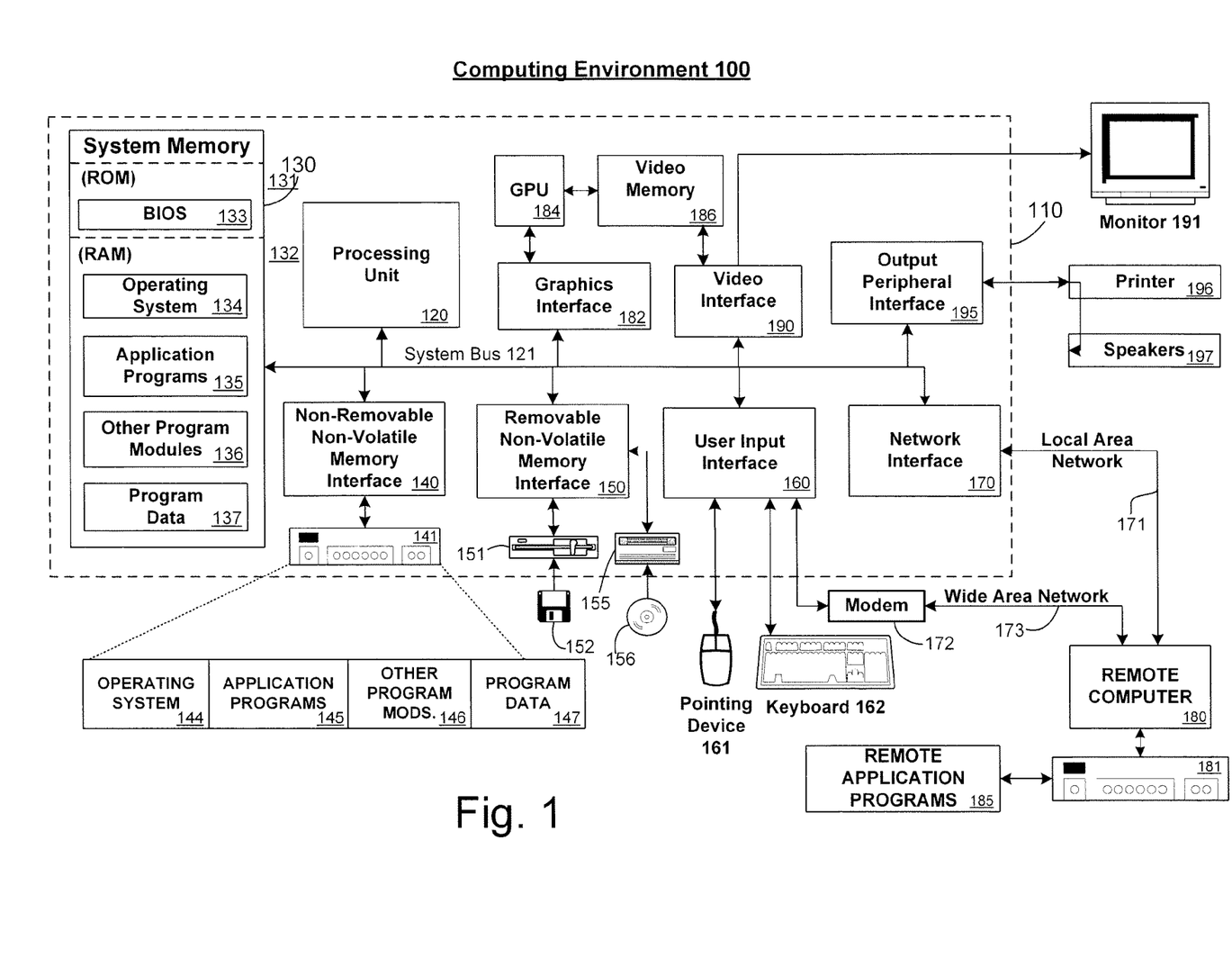
FIG. 1 is a block diagram representing an exemplary computing device.

FIG. 1 illustrates an example of a suitable computing system environment 100 in which the subject matter described above may be implemented. The computing system environment 100 is only one example of a suitable computing environment and is not intended to suggest any limitation as to the scope of use or functionality of the subject matter described above. Neither should the computing environment 100 be interpreted as having any dependency or requirement relating to any one or combination of components illustrated in the exemplary operating environment 100.

With reference to FIG. 1, computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

Figure 2:
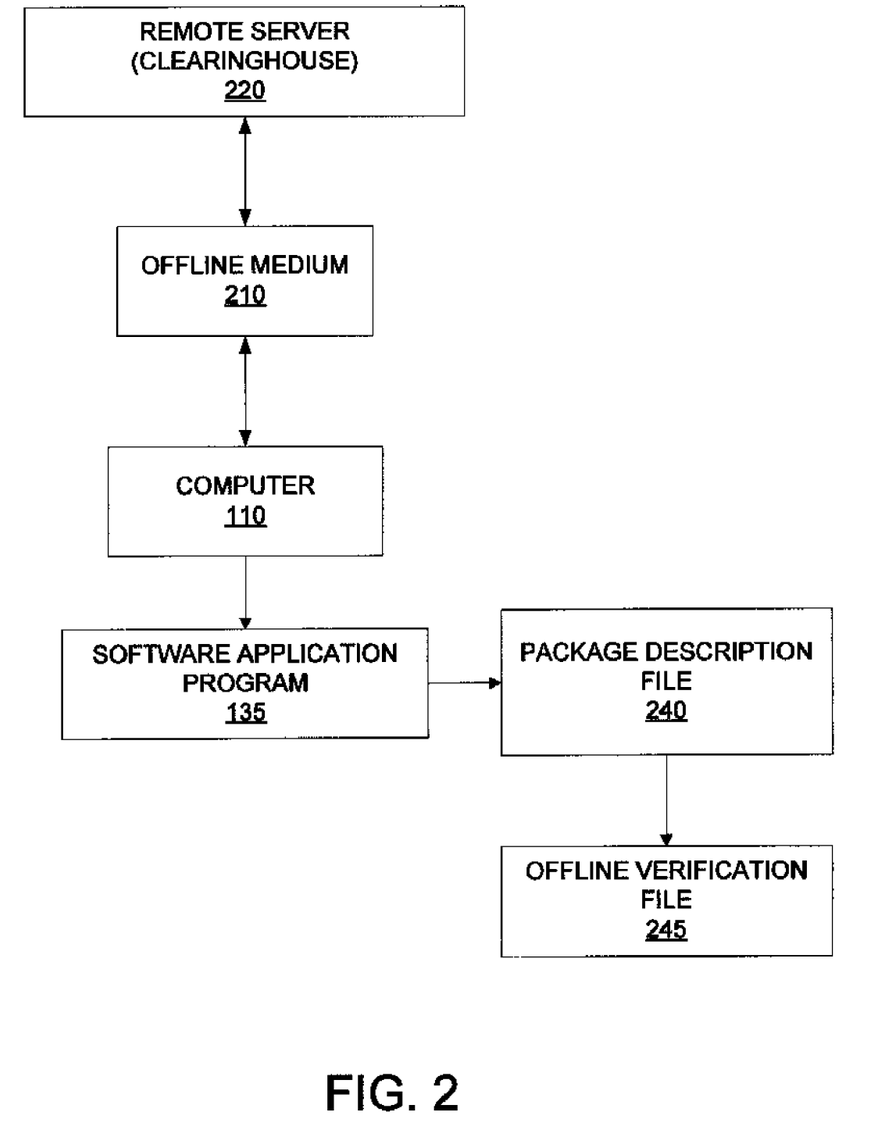
FIG. 2 is a system diagram depicting an exemplary system for performing an offline activation process for a software application program.

It will be understood that application programs 135 typically undergo an activation process before the full rights associated therewith are enabled for computer 110. While the activation process may be performed online (e.g., over a higher bandwidth computer network such as the Internet), an activation process 200 is disclosed herein which is accomplished via an offline medium 210 (e.g., a lower bandwidth medium such as, for example, a telephone). More specifically, offline activation process 200 includes steps which occur both within computer 110 and a remote server 220 which acts as a licensing clearinghouse.

A particular software application program 235 is depicted in FIG. 2 as being loaded onto computer 110, where it includes a package description file 240 which is digitally signed for security. Package description file 240 preferably contains information required for licensing and activation of application program 235. This information typically includes the URL of an Internet server which is capable of performing online activation in addition to various information about the licensed use of application program 235.

In addition, an offline verification file 245 is provided within application program 235 which contains a digital signature. It is preferred that the digital signature consists of at least a hash value (e.g., a 160-bit SHA-1 value) encrypted using the private key of an asymmetric encryption algorithm (e.g., a 1024-bit RSA private key). The hash value can be chosen randomly, but must be known to both application program 235 and remote server 220. Computer 110 may provide a decryption key in order to access the hash value representative of digital signature.

Figure 3:
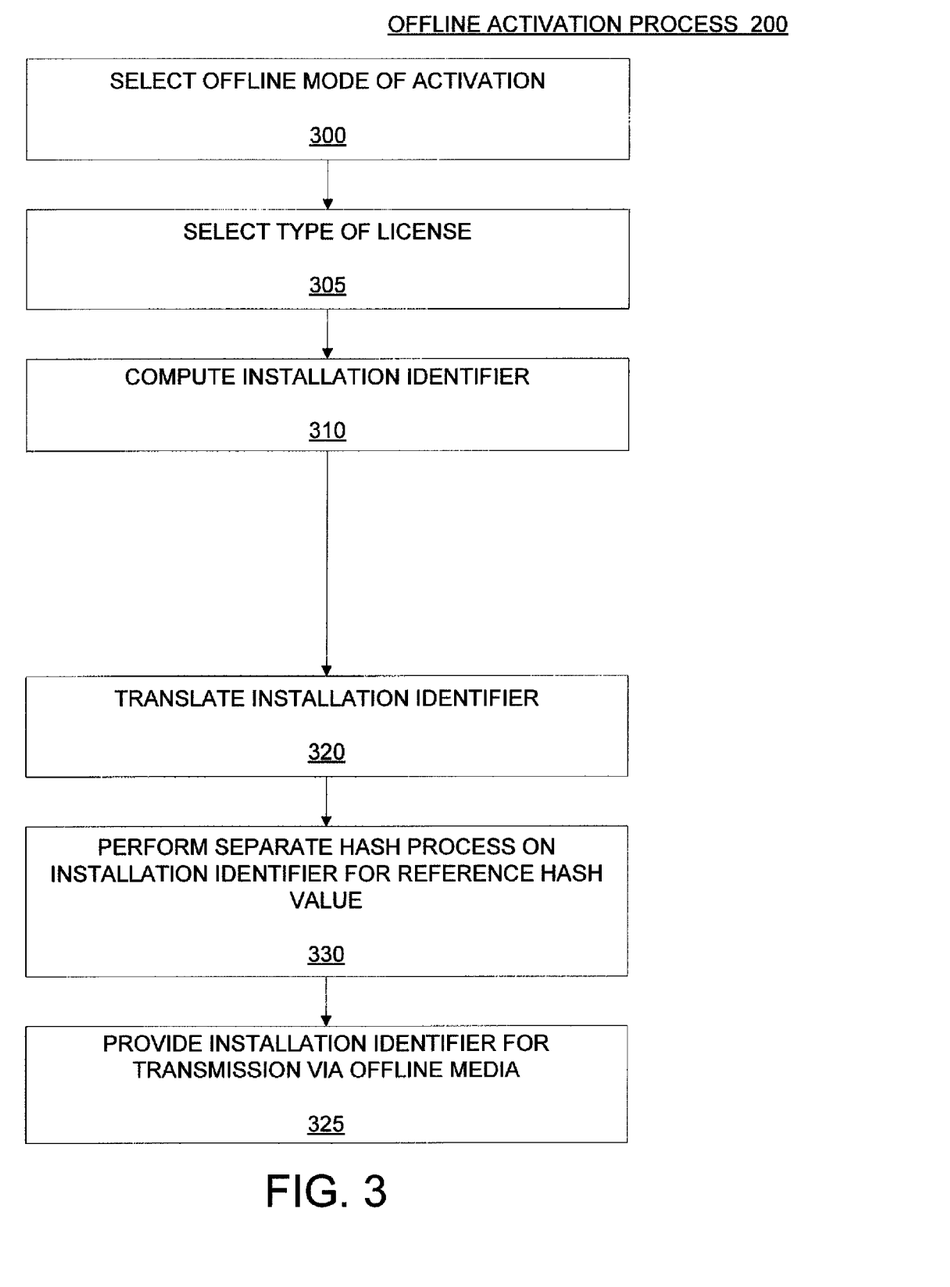
FIG. 3 is a first portion of an offline activation process for a software application program performed by a designated computing device on which the software application program is to be executed.

Turning to the steps of offline activation process 200, a first portion of such process performed by software application program 235 on computer 110 is shown in FIG. 3. At act 300, the offline mode of activation may first be selected. This may occur, for example, via pointing device 161 within a designated area of a window, a drop-down act, or the like. It will also be seen that a license type (e.g., standard, enhanced, beta, trial, etc.) is selected (act 305). Next, an installation identifier is computed (act 310) which preferably is binary data representative of information identifying computer 110 (e.g., type, serial number, etc.) and software application program 135 (e.g., serial number, product ID, etc.). The installation identifier may also include other information related to the licensing process such as a license template and/or license identifier. To compute the installation identifier, a slow hash may be performed on the software, hardware, and possibly other information. After being computed, the installation identifier may be translated into a form easily transmitted via offline media 210 (act 320). Thereafter, the installation identifier is provided to a user for transmission to remote server 220 by means of offline media 210 (act 325). For example, at act 325, the installation identifier may be displayed to a user. The user may then, for example, place a telephone call to the offline activation service and transmit (e.g., by voice or telephone keypad) the installation identifier to the offline activation service during the call.

As part of the initial steps of offline activation process 200 undertaken by application program 235 on computer 110, a separate hash process is preferably performed of the installation identifier (act 330) which can be utilized as a reference hash value to compare with a hash value in package description file 240. This can occur at any time once the step of computing installation identifier (act 310) is completed (i.e., either before or after the installation identifier is transmitted).

Figure 4:
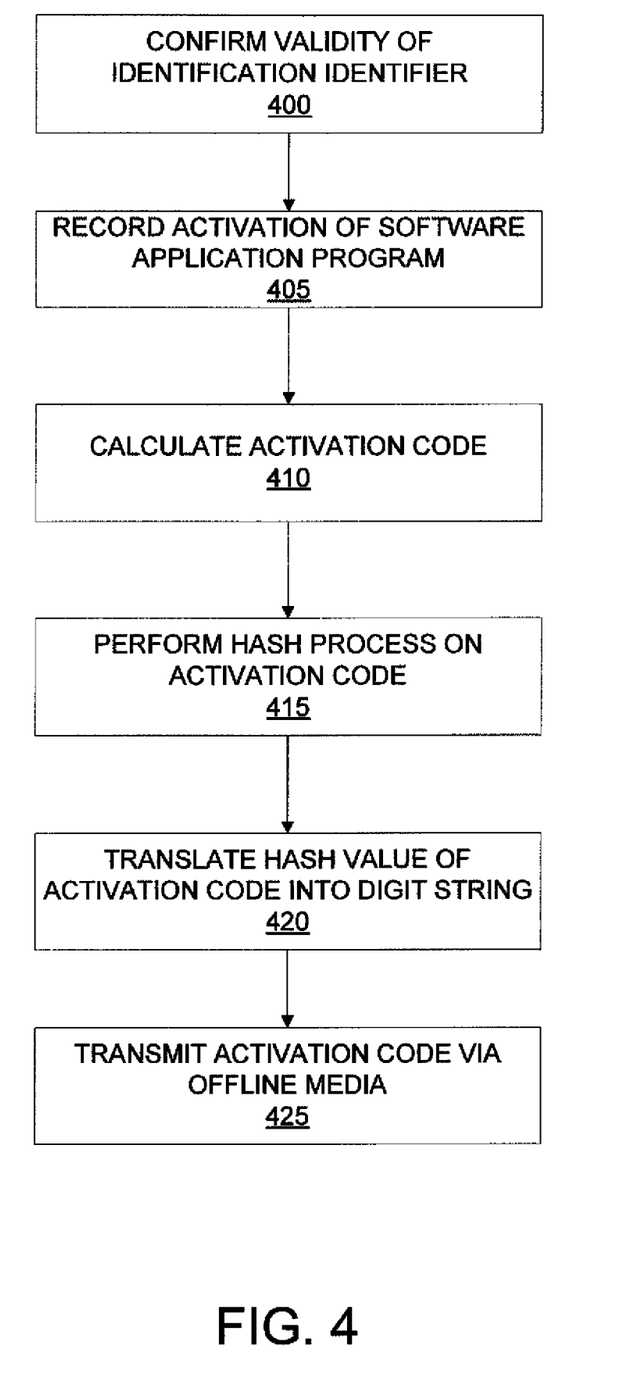
FIG. 4 is a second portion of an offline activation process for a software application program performed by the remote server depicted in FIG. 2; and, FIG. 5 is a third portion of an offline activation process for a software application program performed by the designated computing device.

In the next portion of offline activation process 200 depicted in FIG. 4, remote server 220 performs several steps culminating in an activation code being generated. Before doing so, however, remote server 220 may first determine the validity of the installation identifier transmitted thereto via offline media 210 (act 400). This may be accomplished by means of specified business rules and the composition of the installation identifier. If the installation identifier is valid, remote server 220 records activation of software application program 235 corresponding thereto (act 405). Thereafter, remote server 220 calculates an activation code based on certain information contained therein specific to application program 235 and computer 110 (act 410).

It will be noted that the activation code preferably is a function of the installation identifier and a blinding factor utilized to enhance security. A hash value of the activation code is then preferably created (act 415) by means of a cryptographic hash algorithm (e.g., SHA-1) and translated (i.e., via Base10) into a format easily transferred by offline media 210 (act 420). Thereafter, remote server 220 transmits the activation code by means of offline media 210 (act 425).

In order to facilitate ease in entering such translated activation code into computer 110, it is preferred that the hash value of the activation code becomes a digit string having a minimal number of digits while ensuring a desirable level of security. In particular, it is preferred that the digit string have no more than approximately 40 digits. Depending on the level of security desired, the digit string will more preferably have no more than approximately 30 digits and optimally no more than approximately 25 digits.

Regarding further the calculation of the activation code by remote server 220, it will be appreciated that a pair of additional values are preferably incorporated therein. The first value is an effective hash length, which involves only a specified number of bits in the hash being considered when validating a digital signature within offline verification file 245. The second value is a hash iteration count, which is defined as the number of iterations to be performed on the activation code when creating a hash value for comparison with that in offline verification file 245. Remote server 220 will apply a specified effective hash length (act 430) and a specified hash iteration count (act 435) for a given software application program 235 to the activation code which matches that in package description file 240. In essence, remote server 220 builds into the activation code transmitted via offline media 210 additional data for steps to be performed later by software application program 235 on computer 110.

In the final portion of offline activation process 200 (see FIG. 5), the data string representative of the activation code is input into computer 110 (act 500). A decryption key is then computed by applying a slow hash algorithm to the activation code (act 505). It will be understood that a trial blinding factor is provided with the activation code during this computation. Further, the applicable number of hash iterations stored in package description file 240 are applied thereto, with the resulting hash value being truncated to the effective hash length also stored in package description file 240.

Figure 5:
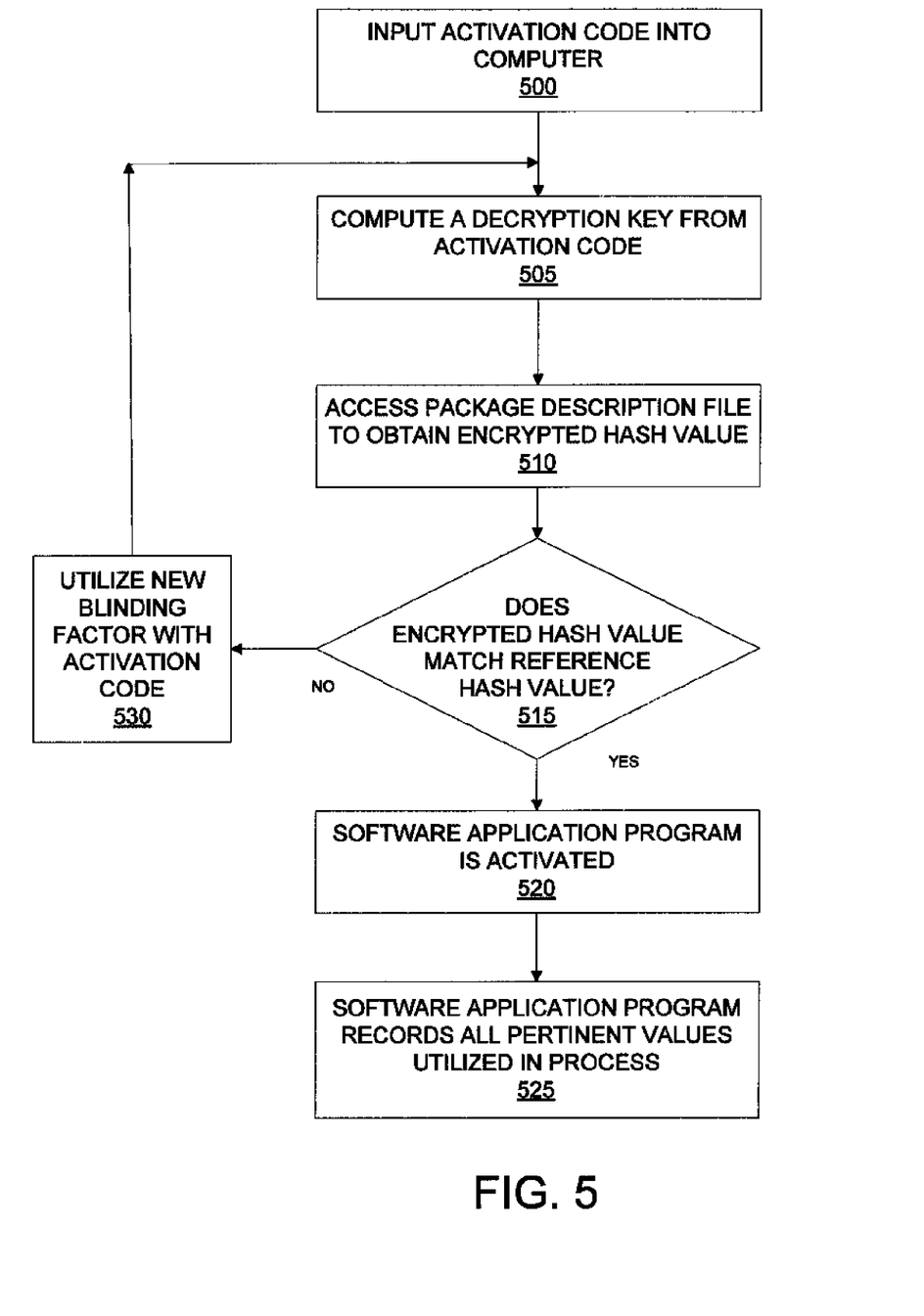

The decryption key is utilized to access package description file 240 and obtain an encrypted hash value corresponding to the installation identifier and optionally additional information such as, for example, the license template and license number (act 510). At this point, the encrypted hash value obtained from package description file 240 is compared to the reference hash value determined in step 330 (decision act 515). If the two hash values match, then software application program 235 is activated (act 520) and software application program 235 preferably records the pertinent values utilized in offline activation process 200 (e.g., the installation identifier, the activation code, the blinding factor, the decryption key, the reference hash value, etc.).

If the encrypted hash value obtained from package description file 240 does not match the reference value, however, then a new blinding factor is provided for use with the activation code (act 530) via a feedback loop 535 and a new decryption key is computed. The steps of accessing package description file 240 to obtain an encrypted hash value (act 510) and comparing such encrypted hash value to the reference hash value (act 515) are then repeated.

Although the above description has referred to a number of acts involving the computation and use of various hash values, it should be recognized that the techniques described herein are not limited to the use of hashing and hash values. Rather, in addition to or as an alternative to hashing, any computationally intensive slow operation may be employed to alter and/or retrieve any of the values or identifiers described herein. In particular, in some embodiments, the computationally intensive slow operations may be made slow due to a memory-intensive task rather than hashing or another central processing unit (CPU) intensive task. One example may be to fill a portion of memory, then perform encryption (a "fast" operation) on repeated memory accesses (the "slow" operation), thereby making the operation slow due to memory access rather than CPU computation.

One illustration of a memory intensive task may be to fill an array of 256 memory locations with data. For example location 0 may have 0000 . . . 0000 (16 bytes, all zeroes), location 1 could have 0101 . . . 0101 (16 bytes, all 0x01). Then, the algorithm could perform repeated encryption of a location, then take the lowest byte of the result as a pointer into the next memory location. Thus, if the result of encrypting location 0x00 had byte 0x5f as the lowest byte, then location 0x5f would be the next location to encrypt. The key for the encryption may be, for example, a hash of the activation code and the blinding factor. This operation may be repeated for as many iterations as desired to produce the "slow" operation. After all iterations are complete, the result of the final encryption of memory may be the overall output value (all memory could be hashed to generate an output value), which may be used interchangeably similarly to an encrypted hash value.

Another illustration of a memory intensive task may be to use a state-machine, such as an RC4 encryption algorithm, that fills a block of memory (256-bytes, in the case of RC4), and then run the machine forward a specified number of iterations. The final state when the algorithm completes may be hashed to produce an output value. Here, no hashing or encryption may be directly employed. Rather, the evolution of the internal state, which is primarily memory-intensive, is the slow operation.

Another illustration of a memory intensive task may be to use a shift-register, such as a Linear Finite Shift Register (LFSR), loaded with an initial value, and then shifted forward in a way that is dependent on the activation code and blinding factor. For example, a hash of the activation code and blinding factor might be the initial state of the LFSR, then, after shifting a specified number of iterations forward, the resulting output may be the final value.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed:

1. A computer readable storage medium that is not a signal and that is for activating a software application for execution on a designated computer, the computer readable storage medium having stored thereon computer executable instructions for performing the following steps:
    (a) computing an installation identifier representative of the software application and the designated computer;
    (b) receiving an activation code generated in accordance with the installation identifier and a blinding factor value, the activation code obtained using an offline medium;
    (c) computing a reference value as a function of the installation identifier;
    (d) computing a decryption key as a function of the activation code and a trial blinding factor value, the computing of the decryption key comprising:
        applying a specified hash algorithm to the activation code and the trial blinding factor a specified number of iterations to obtain a resulting hash value; and
        truncating the resulting hash value to a specified length;
    (e) using the decryption key to access an encrypted value representative of the installation identifier;
    (f) comparing the encrypted value to the reference value
    (g) utilizing a new trial blinding factor value with the activation code when the encrypted value does not match the reference hash value; and
    (h) computing a new decryption key as a function of the activation code and the new trial blinding factor value.

2. The computer readable storage medium of claim 1, wherein the reference value and the encrypted value are computed based on a hash of the installation identifier.

3. The computer readable storage medium of claim 1, wherein the computer executable instructions are further for performing the step of translating the installation identifier to a specified format suitable for transmission over a low bandwidth medium.

4. The computer readable storage medium of claim 3, wherein the translated installation identifier is a digit string having a specified number of digits.

5. The computer readable storage medium of claim 1, wherein the reference value and the encrypted value are computed based on a memory intensive operation.

6. The computer readable storage medium of claim 1, wherein the computer executable instructions are further for performing the step of activating the software application for execution on the designated computer when the encrypted value matches the reference value.

7. The computer readable storage medium of claim 6, wherein the computer executable instructions are further for performing the step of recording information relating to activation of the software application.

8. A method of activating a software application for execution on a designated computer, comprising the following steps:
    (a) computing an installation identifier representative of the software application and the designated computer;
    (b) receiving an activation code generated in accordance with the installation identifier and a blinding factor value, the activation code obtained using an offline medium;
    (c) computing a reference value as a function of the installation identifier;
    (d) computing a decryption key as a function of the activation code and a trial blinding factor value, the computing of the decryption key comprising:

applying a specified hash algorithm to the activation code and the trial blinding factor a specified number of iterations to obtain a resulting hash value; and truncating the resulting hash value to a specified length;

(e) using the decryption key to access an encrypted value representative of the installation identifier;

(f) comparing the encrypted value to the reference value (g) utilizing a new trial blinding factor value with the activation code when the encrypted value does not match the reference value; and (h) computing a new decryption key as a function of the activation code and the new trial blinding factor value.

9. The method of claim 8, further comprising activating the software application for execution on the designated computer when the encrypted value matches the reference value.

10. The method of claim 9, further comprising recording information relating to activation of the software application.

11. The method of claim 8, wherein the reference value and the encrypted value are computed based on a hash of the installation identifier.

12. The method of claim 8, further comprising translating the installation identifier to a specified format suitable for transmission over a low bandwidth medium.

13. The method of claim 12, wherein the translated installation identifier is a digit string having a specified number of digits.

14. The method of claim 8, wherein the reference value and the encrypted value are computed based on a memory intensive operation.

* * * * *